US008510370B2

(12) United States Patent
Quinn et al.

(10) Patent No.: US 8,510,370 B2
(45) Date of Patent: Aug. 13, 2013

(54) ARRAY-BASED DISTRIBUTED STORAGE SYSTEM WITH PARITY

(75) Inventors: Steven C. Quinn, Portsmouth, NH (US); Stanley Rabinowitz, Chelmsford, MA (US)

(73) Assignee: Avid Technology, Inc., Erlington, MA (US)

( * ) Notice: Subject to any disclaimer, the term of this patent is extended or adjusted under 35 U.S.C. 154(b) by 435 days.

(21) Appl. No.: 12/072,397

(22) Filed: Feb. 26, 2008

(65) Prior Publication Data
US 2009/0216832 A1    Aug. 27, 2009

(51) Int. Cl.
*G06F 15/16* (2006.01)
(52) U.S. Cl.
USPC ............... 709/203; 709/215; 709/244; 711/5; 711/11; 711/113; 711/114; 711/162; 710/68
(58) Field of Classification Search
USPC ............... 709/203, 215, 244; 711/5, 11, 114, 711/113, 162; 710/68
See application file for complete search history.

(56) References Cited

U.S. PATENT DOCUMENTS

| | | | |
|---|---|---|---|
| 5,210,866 A | 5/1993 | Milligan et al. |
| 5,371,882 A | 12/1994 | Ludman et al. |
| 5,469,453 A | 11/1995 | Glider et al. |
| 5,473,362 A | 12/1995 | Fitzgerald et al. |
| 5,511,177 A | 4/1996 | Kagimasa et al. |
| 5,537,567 A | 7/1996 | Galbraith et al. |
| 5,644,720 A | 7/1997 | Boll et al. |
| 5,712,976 A | 1/1998 | Falcon, Jr. et al. |
| 5,734,925 A | 3/1998 | Tobagi et al. |
| 5,757,415 A | 5/1998 | Asamizuya et al. |
| 5,790,773 A | 8/1998 | DeKoning et al. |
| 5,829,046 A | 10/1998 | Tzelnic et al. |
| 5,911,046 A | 6/1999 | Amano |
| 5,915,094 A | 6/1999 | Kouloheris et al. |
| 5,926,649 A | 7/1999 | Ma et al. |
| 5,933,603 A | 8/1999 | Vahalia et al. |
| 5,949,948 A | 9/1999 | Krause et al. |
| 5,950,015 A | 9/1999 | Korst et al. |
| 5,959,860 A | 9/1999 | Styczinski |
| 5,978,863 A | 11/1999 | Dimitrijevic et al. |
| 6,021,408 A | 2/2000 | Ledain et al. |
| 6,061,732 A | 5/2000 | Korst et al. |

(Continued)

FOREIGN PATENT DOCUMENTS
EP     0780765 B1    8/2003

OTHER PUBLICATIONS

Asami, Satoshi et al., "The Design of Large-Scale, Do-It-Yourself RAIDs", Nov. 10, 1995, pp. 1-30.

(Continued)

*Primary Examiner* — Thuong Nguyen
(74) *Attorney, Agent, or Firm* — Oliver Strimpel

(57) ABSTRACT

In one general aspect, a data access method is disclosed that includes directing data block write requests from different clients to different data storage servers based on a map. Data blocks referenced in the data block write requests are stored in the data storage servers. Data from the data write requests are also relayed to a parity server, and parity information is derived and stored for the blocks. This method can reduce the need for inter-server communication, and can be scaled across an arbitrary number of servers. It can also employ parity load distribution to improve the performance of file transfers.

15 Claims, 3 Drawing Sheets

(56) References Cited

U.S. PATENT DOCUMENTS

| | | | |
|---|---|---|---|
| 6,070,191 A | 5/2000 | Narendran et al. | |
| 6,134,596 A | 10/2000 | Bolosky et al. | |
| 6,138,221 A | 10/2000 | Korst et al. | |
| 6,185,621 B1 | 2/2001 | Romine | |
| 6,282,670 B1 | 8/2001 | Kalman et al. | |
| 6,374,336 B1 | 4/2002 | Peters et al. | |
| 6,415,373 B1 | 7/2002 | Peters et al. | |
| 6,449,688 B1 | 9/2002 | Peters et al. | |
| 6,646,576 B1 * | 11/2003 | Delvaux et al. | 341/60 |
| 6,760,808 B2 | 7/2004 | Peters et al. | |
| 6,785,768 B2 | 8/2004 | Peters et al. | |
| 7,111,115 B2 | 9/2006 | Peters et al. | |
| 7,487,309 B2 | 2/2009 | Peters et al. | |
| 2002/0124137 A1 * | 9/2002 | Ulrich et al. | 711/113 |
| 2003/0097518 A1 * | 5/2003 | Kohn et al. | 711/5 |
| 2003/0126523 A1 * | 7/2003 | Corbett et al. | 714/718 |
| 2003/0149750 A1 * | 8/2003 | Franzenburg | 709/220 |
| 2005/0055521 A1 * | 3/2005 | Saika | 711/162 |
| 2005/0097270 A1 * | 5/2005 | Kleiman et al. | 711/114 |
| 2005/0165617 A1 * | 7/2005 | Patterson et al. | 705/1 |
| 2006/0212625 A1 * | 9/2006 | Nakagawa et al. | 710/68 |
| 2006/0248378 A1 * | 11/2006 | Grcanac et al. | 714/6 |
| 2008/0147678 A1 | 6/2008 | Peters et al. | |
| 2010/0020820 A1 * | 1/2010 | Jones | 370/465 |

OTHER PUBLICATIONS

Birk, Yitzhak, "Random RAIDs with Selective Exploitation of Redundancy for High Performance Video Servers", EE Dept. of Israel Institute of Technolgy, 1997 IEEE, pp. 13-23.

Brubeck et al., "Hierarchical Storage Management in a Distributed VOD System", IEEE Multimedia 1996, pp. 37-47.

Chen, Peter et al., "RAID: High Performance, Reliable Secondary Storage", ACM Computing Surveys, vol. 26, No. 2, pp. 145-185, Jun. 1994.

Massiglia, Paul, The Raidbook, "A Source Book for Disk Array Technology", Fourth Ed., Aug. 1994, pp. ii-45.

Stephenson et al., "Mass Storage Systems for Image Management and Distribution". IEEE Symposium on Mass Storage Systems, 1993, pp. 233-240.

Ying-Dar Lin et al., A Hierarchical Network Storage Architecture for Video-on-Demand Services, IEEE Transactions on Computers, 1996, pp. 355-364.

Chen, Peter et al., "Striping in a RAID Level 5 Disk Array", ACM Computing Surveys, 1995, pp. 136-145.

Pease et al., "IBM Storage Tank, A Distributed Storage System", IBM Almaden Research Center, R.C. Burns: John Hopkins Univ., DDE, Long: Univ.of California, Santa Cruz, Jan. 24, 2002, pp. 1-7.

Drapeau, A.L. et al., "Striped Tape Arrays", IEEE Symposium on Mass Storage Systems, 1993, pp. 257-265.

Liu et al., "Performance of a Storage System For Supporting Different Video Types and Qualities", IEEE Journal on Selected Areas in Communications, 1996, pp. 1314-1331.

Birk, Y., "Deterministic Load-Balancing Schemes For Disk-Based Video-on-Demand Storage Servers", IEEE Symposium on Mass Storage Systems, 1995, pp. 17-25.

Triantafillou et al., "Overlay Stiping and Optimal Parallel I/O For Modern Applications", Parrallel Computing, 1997, pp. 21-43.

Buddhikot et al., "Design of Large Scale Multimedia Storage Server", Computer Networks and ISDN Systems, 1994, pp. 503-517.

Flynn, R., et al., "Disk Stiping and Block Replication Algorithms for Video File Servers", IEEE Proceedings of Multimedia Applications, 1996, pp. 590-597.

Ganger, G.R. et al., "Disk Subsystem Load Balancing: Disk Striping vs Conventional Data Placement", IEEE Transactions on Computers, 1993, pp. 40-49.

Tewari, R., et al., "High Availability in Clustered Multimedia Servers", IEEE Transactions on Computers, 1996, pp. 645-654.

"Method to Deliver Scalable Video Across A Distributed Computer System", IBM Technical Disclosure, May 1994, pp. 251-256.

* cited by examiner

ARRAY-BASED DISTRIBUTED STORAGE SYSTEM WITH PARITY

FIELD OF THE INVENTION

This invention pertains to array-based distributed storage systems with parity functionality.

BACKGROUND OF THE INVENTION

Array-based distributed storage systems are well known. These systems distribute data over two or more different disks to improve data access times, provide fault tolerance, or both. Distributed storage systems can employ different RAID configurations, as described in "A Case for Redundant Arrays of Inexpensive Disks (RAID)," by David Patterson et al., SIGMOD Conference: pp 109-116, (1988), which is herein incorporated by reference.

One high performance distributed storage system is sold by Avid Technology, Inc. of Tewksbury, Mass. under the Unity ISIS® trade name. This system is described in more detail in U.S. Pat. Nos. 7,111,115 and 6,785,768 as well as in published application numbers 2007/0083723 and 2007/0136484, which are all herein incorporated by reference. In the ISIS® system a redundant copy of all data is stored on a different drive in an array. If a drive fails, therefore, the redundant copies can be used to reconstruct it.

SUMMARY OF THE INVENTION

In one general aspect, the invention features a data access method that includes directing data block write requests from different clients to different data storage servers based on a map. Data blocks referenced in the data block write requests are stored in the data storage servers. Data from the data write requests are also relayed to a parity server, and parity information is derived and stored for the blocks.

In preferred embodiments the method can further include independently generating the map by each of the clients. The step of independently generating the map by each of the clients can use a same predetermined permutation seed. The step of independently generating the map by each of the clients can generate a repetitive map. The step of independently generating the map by each of the clients can generate a map that is at least as long as the least common multiple of a number of data storage servers and a number of blocks for a super block for which parity is computed. The data storage servers and the parity server can be members of a group of storage servers and with the map defining which of the group members are data storage servers and which of the group members is a parity server for particular write requests. The map can change which members of the group are used as a parity server to distribute load resulting from the step of deriving. The steps of directing, storing, relaying and deriving can operate on a block size of a power of two Kilobytes. The method can further include the step of maintaining file system information that associates the blocks with files in a file system. The step of deriving parity information can operate according to a row-diagonal parity coding scheme. The steps of relaying and deriving can operate according to a single parity element. The steps of relaying and deriving can operate according to row and diagonal parity elements. Both row and diagonal parity can be calculated on one of the parity servers with the non-native parity being forwarded to the other parity server.

In another general aspect, the invention features an array-based distributed storage system with clients that each include map generation logic and a communication interface. A plurality of storage servers is also provided, which each include a communication interface responsive to the clients, data storage logic responsive to the communication interface, parity logic responsive to the communication interface, selection logic operative to determine whether to enable the data storage logic or the parity logic for a particular data block based on results of the map generation logic for that block, and relaying logic operative to relay a copy of a block to another of the servers in response to a determination by the selection logic that the data storage logic should be enabled for that block.

In preferred embodiments, the storage servers can each further include a local copy of the same map generation logic as do the clients, with the selection logic for each of the servers being responsive to its local map generation logic to determine whether to enable the data storage logic or the parity logic for a particular data block. The map generation logic can be operative to generate a map that distributes parity loading across the servers. The parity logic can operate according to a row-diagonal parity scheme. The parity logic can include native parity logic operative to derive and store a native parity block and non-native parity logic operative to derive and forward a non-native parity block to another one of the servers.

In a further general aspect, the invention features an array-based distributed storage system that includes means for directing a series of different data block write requests from one of a series of different clients to a plurality of different data storage servers based on a map, means for storing data blocks referenced in the data block write requests in the data storage servers, means for relaying the data from the data write requests to a parity server, and means for deriving and storing parity information for the series of blocks.

Systems according to the invention can provide for efficient storage access by providing a simple storage and parity server mapping method. Because this mapping method can be replicated on different servers, the need for inter-server communication can be reduced. And the method can be scaled across an arbitrary number of servers.

Systems according to the invention may also be advantageous in that they can distribute the load of parity determinations across an array of servers. This can improve the performance of file transfers and can eliminate a single RAID controller as a central bottleneck.

DESCRIPTION OF AN ILLUSTRATIVE EMBODIMENT

Figure 1:
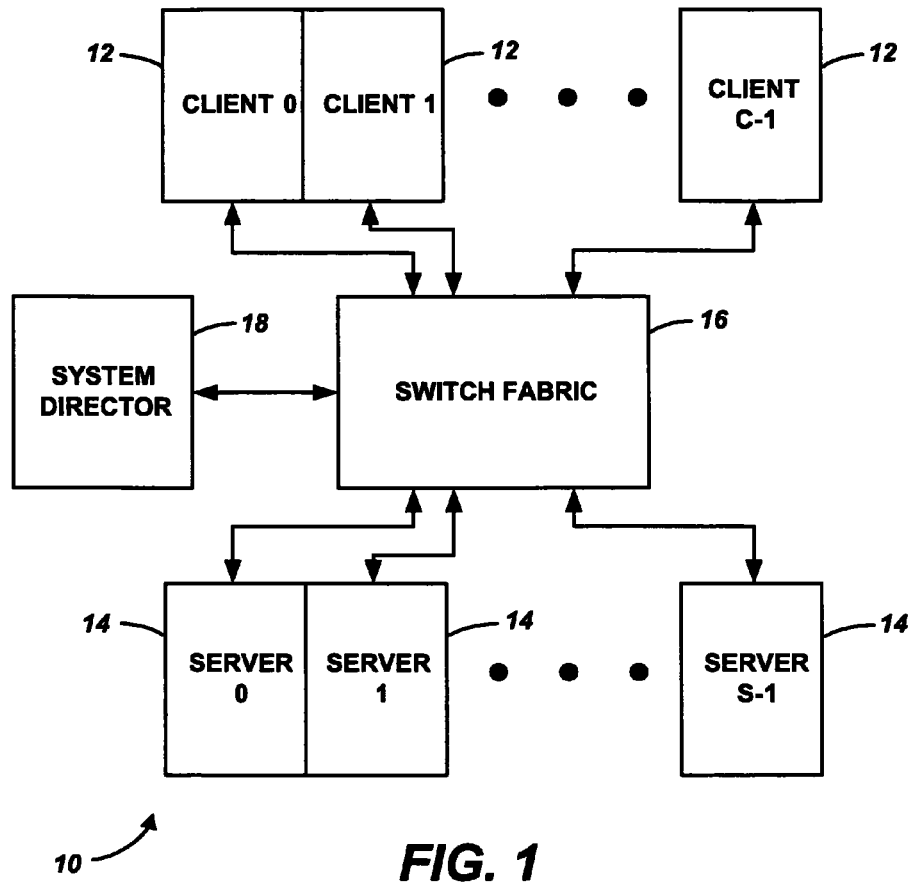
FIG. 1 is a block diagram of an illustrative storage system according to the invention.

Referring to FIG. 1, a distributed storage system 10 according to the invention includes one or more clients 12 that can communicate through a switch fabric 16 with a system director 18 and one or more servers 14 in a disk server array. In this embodiment, the system is preferably based on the ISIS® system presented above. This system conveys information between the client and server systems through an Internet Protocol (IP) switching fabric using a variable data block size (e.g., 256K).

Each of the servers 14 can act as a data storage server or a parity server. As is well known, the server's parity functionality provides redundant information for error correction in the case of a storage failure. In this embodiment, the parity functionality determines parity based on a well-known method described in "EVENODD: An Optical Scheme for Tolerating Double Disk Failures in RAID Architectures," by Mario Blaum et al., IEEE (1994), which is herein incorporated by reference.

The use of a single parity server by itself is sufficient to implement a system based on RAID-5, which is intended to tolerate the failure of a single storage server (known as a "blade"). In the event of such a failure, read access requests from the clients are serviced with data reconstructed from the parity data. An optional secondary parity server may also be provided in the case of a RAID-6 configuration.

In one embodiment, the servers are implemented with blades interconnected by an IP switch fabric, although they could of course also use a different communication protocol. Each of the blades includes a LINUX-based processor running custom software that controls two 512 gigabit or 1-terabyte disk drives, although the system can handle disks of a variety of sizes. The system could of course also be based on other operating systems or even dedicated hardware, or a combination of both.

Figure 2:
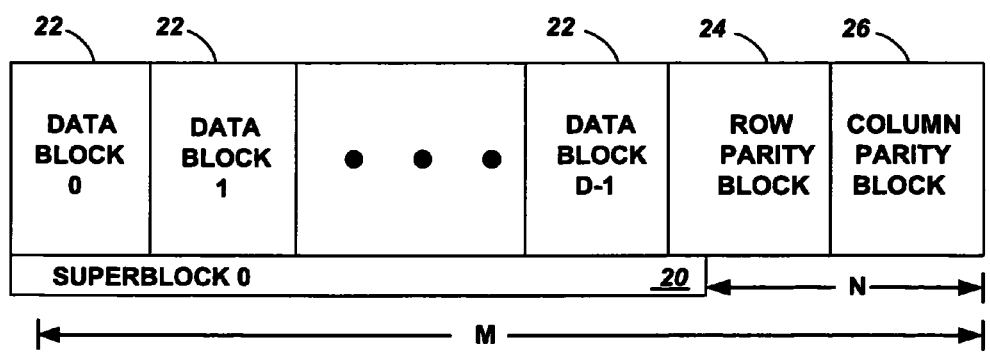
FIG. 2 is a data diagram for use with the system of FIG. 1.

Referring to FIG. 2, the distributed storage system 10 operates on data blocks 22 that are grouped into super blocks 20. Once stored, each super block is associated with one or two parity blocks 24, 26. In addition to its data payload, each block in a super block includes a header that can include file metadata and other system information. The system director 18 manages file system metadata that associates blocks with the files that they are a part of.

Write access can be provided in a manner that seamlessly replaces a mirrored configuration. Specifically, duplicate writes normally directed to a mirrored server can be simply directed to the parity server(s) instead, without any significant changes to the client software.

A client normally writes or reads from a primary server, and in an error case, it will fail over to the parity server. In the write case, a primary server will forward the data from the client to the parity server for that given set of data. Once a parity server has all of the blocks required to generate parity data, it will do so and write the parity data to its internal store, although it can also store and manage partial stored parity blocks. In the case of RAID-6, one parity device will calculate both row and diagonal parity, write the "native" block to its internal store, and forward the other parity block to the secondary parity device where it will be stored.

Figure 3:
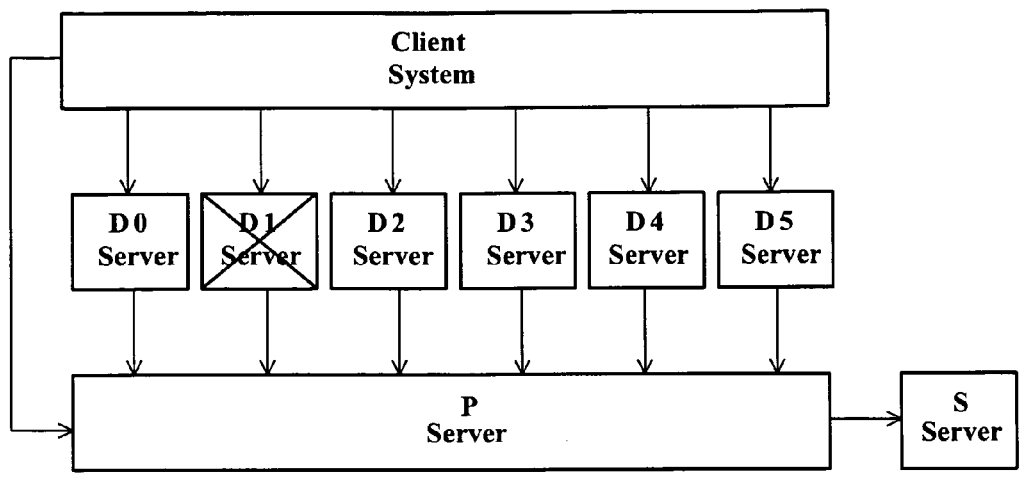
FIG. 3 is a block diagram illustrating a write operation for a distributed storage system according to the invention, such as the one shown in FIG. 1, in the case of a RAID-6-type implementation with a single failed server.

Referring to FIG. 3, a client can detect when one of a series of data servers D0-D5 is down, and, using the same logic it uses to write to a mirror server on a mirror-based system, it writes to the appropriate parity server S by directly giving it all the data required to generate both sets of parity data. In the "happy" read case, the client just gets data directly from the servers D0-D5 as it would in a mirrored or un-mirrored workspace. In the "sad" read case shown in FIG. 3, the client asks the parity server 14 for the missing data block or blocks, and the parity server P collects the data required to rebuild it. Since the required data are probably already in the data server's cache, each read operation should only result in one read from disk, but will result in extra network traffic.

Figure 4:
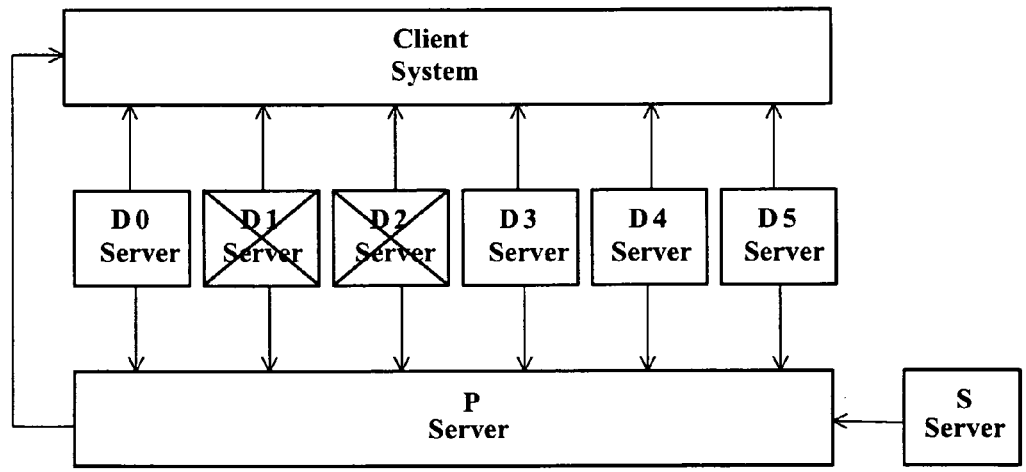
FIG. 4 is a block diagram illustrating a write operation for a distributed storage system according to the invention with two failed servers on the storage system shown in FIG. 3.

FIG. 4 shows a sad read case with two servers D1, D2 down. Here the parity server P gets a request for the blocks that should have been on D1 and D2 and it requests data from D0, D3, D4, D5 and the secondary parity server S to reconstruct D1 and D2 for the client. When the data are reconstructed, the parity server P returns them to the client.

Figure 5:
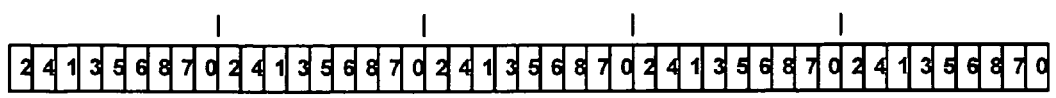
FIG. 5 is an illustrative server map for a storage system, such as the one shown in FIG. 1, with nine servers and a block size of five.
Figure 6:
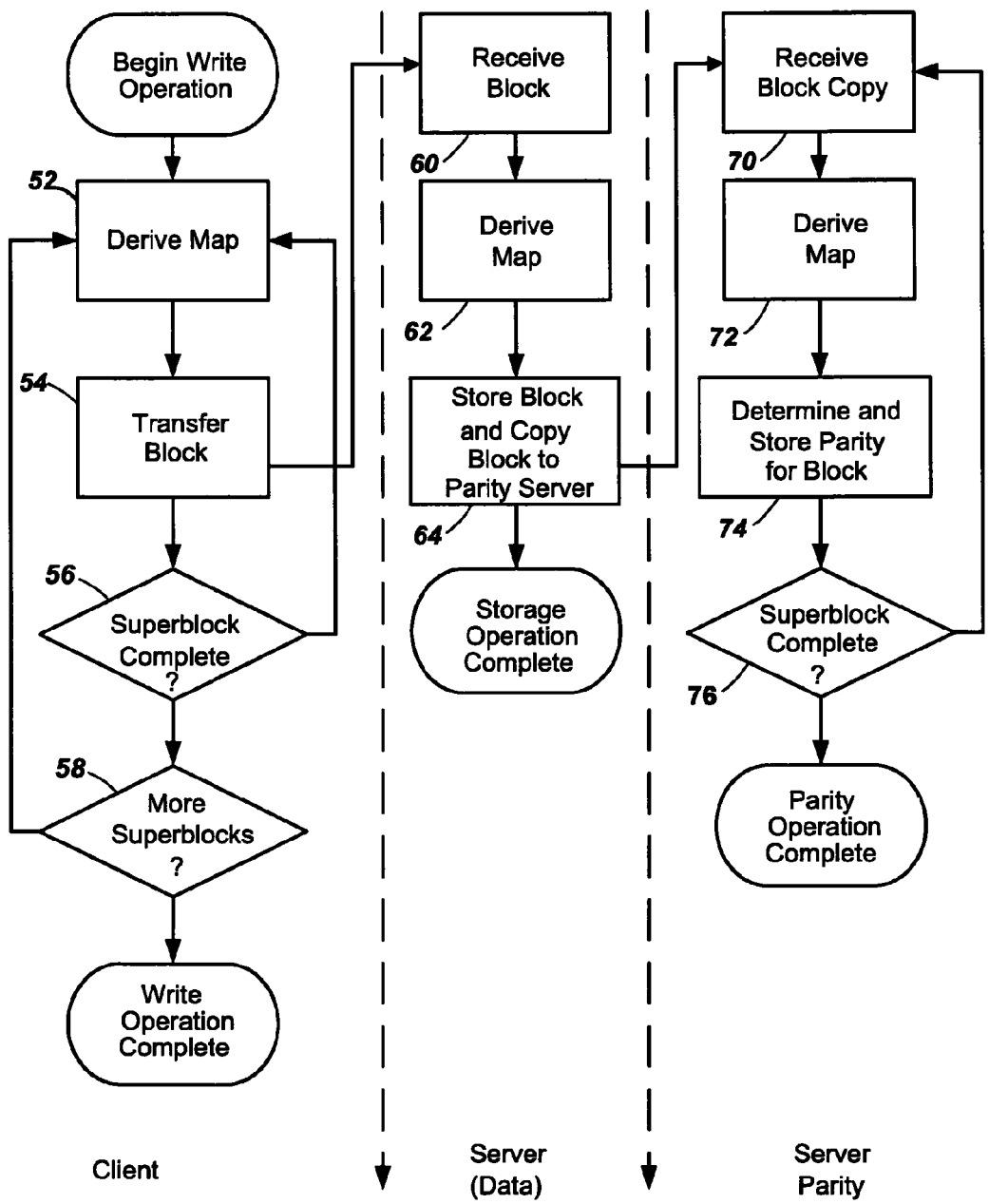
FIG. 6 is a flowchart showing an illustrative write operation for the storage system of FIG. 1.

Referring to FIGS. 5 and 6, maps are generated to ensure that for any given set of servers, each super block of data results in a different parity server. This helps share the load of calculating parity across servers in a random fashion. If a row parity server is down, the client fails over to the diagonal server as if it were a second mirror copy.

Maps are generated on a per-file basis and have the following requirements/properties:
  Computationally easy to compute (server location from file offset)
  Flat distribution of server use (random permutation) regardless of file size
  Even distribution of parity server "roles" through the map (each server spends equal time doing parity calculations).
The following properties are defined:
  Super Block=Data stripe width in blocks excluding parity
  F=File Block Offset (pure data block offset in file assuming no parity)
  M=Super Block width in blocks (including parity block(s))
  S=number of servers available (allocation group)
  B="Big Block" width in blocks=least common multiple of M and S, smallest repeat of S servers that will align with M blocks.
  The big block will repeat as required to ensure distributed parity
  The big block will be constructed such that an even number of super blocks can fit in it using a random permutation of "S" servers
  N=number of parity blocks for a super block (1 for RAID-5 and 2 for RAID-6)
  D=Data Blocks in super block=M−N=Super Block A map is generated by first obtaining a random permutation over the available servers using the same pseudo random technique used for ISIS® map generation (see US published application no. US2007/0073990, entitled "Distribution of Data in a Distributed Shared Storage System," published Mar. 29, 2007, which is herein incorporated by reference). This permutation is based on a seed obtained from the system director 18 at power-up and can be called P[0 . . . S−1]. A B field can then be defined to consist of M of these permutations laid down one after the other in order. To ensure even distribution of party this B field is replicated M times and will assign the nth element of each super block to parity (and possibly the n+1 element as well in the RAID-6 case) where n is the B field replication number from 0 . . . M−1 (see FIG. 5 for an illustrative map for S=9, M=5).

With the extended map consisting of M*B elements, the following equations enable a client to find what it needs based on a file offset F.

$$SB = \text{super block number} = F/D = \text{File Block Offset/Data blocks per super block}$$

$$SBR = \text{super block remainder} = F\%D = \text{offset of this data block with respect to other data blocks in super block}$$

$$BBN = \text{big block number} = ((SB*M)/B)\%M$$

$A$=absolute offset in super block including parity=$SBR<BBN\ ?SBR:SBR+N$ (special case required where $N=2$ on our last $BBN$ ($BBN=M-1$) $A=SBR+1$ $O$=offset into permutation for this server=$((SB*M)+A)\%S$ $P$=offset into permutation for first parity server=$((SB*M)+BBN)\%S$ $P2$=offset into permutation for second party server if $N>1=((SB*M)+BBN+1)\%S$ So, the data block associated with F would be:

$$P[((F/D*M)+(F\%D<((F/D*M)/B)\%M)?F\%D:F\%D+N)\%S]$$

And the data block for the first (row) parity block associated with the super block that F lies in would be:

$$P[((F/D*M)+(F/D*M)/B\%M)\%S]$$

EXAMPLE 1

For an illustrative RAID-5 map for a set of 9 servers with a RAID block size of 5 (4 data+1 parity):

$S=9, N=1, M=5, D=4, B=45$ (see FIG. 5)

To find the server associated with file block 25:

$SB=F/D=25/4=6$ $SBR=F\%D=25\%4=1$ $BBN=((SB*M)/B)\%M=((6*5)/45)\%5=0$ $A=1<0?1:2=2$ $O=((SB*M)+A)\%S=((6*5)+2)\%9=5$

The data block will therefore be P[5].
To find the parity server associated with file block 25:

$P=((SB*M)+BBN)\%S=((6*5)+0)\%9=3$

The party block would therefore be P[3].

EXAMPLE 2

A test program was run using the method presented above for S=9, M=5, N=1, for a set of 1000 blocks

---

Permutation: 8 4 1 2 5 6 3 7 0
Data use:
Block use D0: 250 D1: 250 D2: 250 D3: 250
S000 D: 110, P: 112
S001 D: 111, P: 112
S002 D: 111, P: 112
S003 D: 112, P: 108
S004 D: 112, P: 108
S005 D: 111, P: 112
S006 D: 111, P: 112
S007 D: 111, P: 112
S008 D: 111, P: 112

---

EXAMPLE 3

A test program was run using the method presented above for S=50, M=6, N=2, for a set of 1000 blocks

---

Permutation: 35 49 44 38 0 23 10 29 1 14 24 26 5 27 36 12 33 40 4 2 34 32 42 16
4 8 15 6 8 31 11 45 22 25 30 28 7 37 21 20 43 46 13 41 19 3 18 47 39
9 17
Data use:
Block use D0: 250 D1: 250 D2: 250 D3: 250
S000 D: 20, P: 40
S001 D: 20, P: 40
S002 D: 20, P: 40
S003 D: 20, P: 40
S004 D: 20, P: 40
S005 D: 20, P: 40
S006 D: 20, P: 40
S007 D: 20, P: 40
S008 D: 20, P: 40
S009 D: 20, P: 40
S010 D: 20, P: 40
S011 D: 20, P: 40
S012 D: 20, P: 40
S013 D: 20, P: 40
S014 D: 20, P: 40
S015 D: 20, P: 40
S016 D: 20, P: 40
S017 D: 20, P: 40
S018 D: 20, P: 40
S019 D: 20, P: 40
S020 D: 20, P: 40
S021 D: 20, P: 40
S022 D: 20, P: 40
S023 D: 20, P: 40
S024 D: 20, P: 40
S025 D: 20, P: 40
S026 D: 20, P: 40
S027 D: 20, P: 40
S028 D: 20, P: 40
S029 D: 20, P: 40
S030 D: 20, P: 40
S031 D: 20, P: 40
S032 D: 20, P: 40
S033 D: 20, P: 40
S034 D: 20, P: 40
S035 D: 20, P: 40
S036 D: 20, P: 40
S037 D: 20, P: 40
S038 D: 20, P: 40
S039 D: 20, P: 40
S040 D: 20, P: 40
S041 D: 20, P: 40
S042 D: 20, P: 40
S043 D: 20, P: 40
S044 D: 20, P: 40
S045 D: 20, P: 40
S046 D: 20, P: 40
S047 D: 20, P: 40
S048 D: 20, P: 40
S049 D: 20, P: 40

---

The rules for redistribution are as follows:
1. Any replaced blocks must come from a server not in the same super block as the new one
2. Data movement and subsequent parity generation should be minimized
3. In systems where disks are replaceable without removal of a micro-server, replacement is desirable over redistribution
   a. Redistribution should not be automatic if Raid is enabled
   b. Replacement should be done with minimal communication with other servers
4. In systems where disks and micro-servers are bound together in a field replaceable unit (FRU), redistribution would be desirable over replacement (remove server first, re-distribute data, replace server later).
   a. Redistribution could be automatic or not depending on customer requirements.
   b. The system would be able to restore itself to a fully protected state very quickly when a server is removed. Adding a server back would be slower, but this operation is not time critical (no chance of losing data).

Referring to FIG. 6, an illustrative write operation begins with the derivation of a map (step 52) to determine where the blocks that make up a file are to be stored. The blocks are then transferred to the appropriate server based on the derived map (step 54). These steps are repeated for each bock in each super block until the write operation is complete (see steps 56 and 58).

When a server receives a block (step 60) it first determines whether it is has been assigned to act as a data storage server or a parity server. It can make this determination based a version of the map that it derives locally (step 62) or it can examine header information that the client provides based on its map. Once it has determined that it is a data storage server, it stores the block and copies it to the appropriate parity server (step 64). The location of the appropriate parity server can be determined from the map or from header data.

When a server receives a copied block (step 70) it first determines whether it has been assigned to act as a data storage server or a parity server. It can make this determination based a version of the map that it derives locally (step 72) or it can examine header information that the client provides based on its map. Once it has determined that it is a parity server, it determines and stores the parity information for the block (step 74). These operations are completed for each block in a full or partial super block (see step 76). In a RAID-6 implementation, the parity server calculates both row and diagonal parity and forwards the diagonal parity to the appropriate second parity server.

In the illustrative embodiment, the servers maintain a linked list of partially complete parity blocks. Entries in the list are created when the first block in a super block is received, and they are removed from the list when the parity block is complete and ready to be stored on disk. Partially complete parity blocks are stored after entries remain on the list for longer than a specified period.

The flowcharts presented above represent an overview of the operation of the illustrative embodiment. But one of ordinary skill in the art would recognize that other approaches to implementing the inventive concepts in this applications could result in somewhat different breakdowns of steps without departing from the spirit and scope of the invention. A server could use parallelized hardware, for example, to simultaneously send different blocks to different servers based on a single map derivation step. Other minor features and optimizations, such as the details of handling of partial blocks, are not shown because one of ordinary skill would readily be able to implement them without undue experimentation.

Referring to FIG. 5, repetition in the maps allows the system to use an arbitrary number of servers. More specifically, by using a map that is the least common multiple of the number of servers S and the super block size with parity M, the system ensures that no super blocks from a super group are ever stored by the same data server. This allows for the use of an arbitrary number of servers for a given super block size and parity model, without introducing the possibility of a double error on the same super block.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. An array-based distributed storage system, comprising:
   a plurality of clients that each include a communication interface,
   a plurality of storage servers that each include a communication interface,
   a computer network interconnecting the plurality of clients and the plurality of storage servers through their respective communication interfaces;
   storage for storing a map defining, for each write request for a data block, which of the plurality of storage servers is a data storage server and which of the plurality of storage servers is a parity server;
   wherein a client determines, for a write request for a particular data block, the data storage server for the particular data block in accordance with the map and transmits the write request for the particular data block to the determined data storage server; and
   wherein each storage server comprises:
      selection logic operative to enable data storage logic and relaying logic if the selection logic determines, in accordance with the map, that a particular received data block is to be stored on the storage server and operative to enable parity logic if the selection logic determines, in accordance with the map, that the particular received data block is to be used to generate a parity block to be stored on the storage server;
      wherein the data storage logic is operative to store the particular received data block at the storage server in response to a determination by the selection logic that the particular received data block is to be stored on the storage server, and
      wherein the parity logic is operative to generate and store on the storage server a parity block using the particular received data block in response to a determination by the selection logic that the particular received data block is to be used to generate a parity block to be stored on the storage server; and
   wherein the relaying logic is operative to relay a copy of the particular received data block to the parity server for the particular received data block in accordance with the map in response to a determination by the selection logic that the particular received data block is to be stored on the storage server.

2. The array-based distributed storage system of claim 1 wherein each of the storage servers includes a local copy of the map and wherein each of the clients includes a local copy of the map, and wherein the selection logic for each of the servers is responsive to its local copy of the map to determine whether to enable the data storage logic or the parity logic for a particular received data block.

3. The array-based distributed storage system of claim 2 wherein the parity logic includes native parity logic operative to derive and store a native parity block and non-native parity logic operative to derive and forward a non-native parity block to another one of the servers.

4. The array-based distributed storage system of claim 3 wherein the parity logic operates according to a row-diagonal parity scheme.

5. The array-based distributed storage system of claim 2 wherein the map distributes parity loading across the servers.

6. The array-based distributed storage system of claim 5 wherein the parity logic includes native parity logic operative to derive and store a native parity block and non-native parity logic operative to derive and forward a non-native parity block to another one of the servers.

7. The array-based distributed storage system of claim 1 wherein the map distributes parity loading across the servers.

8. The array-based distributed storage system of claim 1 wherein the parity logic operates according to a row-diagonal parity scheme.

9. The array-based distributed storage system of claim 1 wherein the parity logic includes native parity logic operative to derive and store a native parity block and non-native parity logic operative to derive and forward a non-native parity block to another one of the servers.

10. The array-based distributed storage system of claim 9 wherein the parity logic operates according to a row-diagonal parity scheme.

11. The array-based distributed storage system of claim 1, wherein a group of data blocks forming a parity group is stored by:
the client accessing the map and sending each data block in the parity group to the storage server assigned to the data block by the map;
each storage server, when receiving one of the data blocks in the parity group from the client, enabling the data storage logic of the storage server to store the data block on the storage server and enabling the relaying logic of the storage server to relay a copy of the data block to the parity server assigned to the group of data blocks by the map;
the storage server that is the parity server assigned to the group of data blocks by the map receiving the copies of the data blocks from the other storage servers and enabling the parity logic of the storage server to compute and store a parity block for the group of data blocks.

12. An array-based distributed storage system, comprising:
a plurality of clients that each include a communication interface,
a plurality of storage servers that each include a communication interface,
a computer network interconnecting the plurality of clients and the plurality of storage servers through their respective communication interfaces;
storage for storing a map defining, for each data block in a group of data blocks, which of the plurality of storage servers is a data storage server for the data block and, for the group of data blocks, which of the plurality of storage servers is a parity server for parity data for the group of data blocks, wherein each of the plurality of storage servers acts as a data storage server and as a parity server for different groups of data blocks;
wherein a client, when storing a particular data block on the plurality of storage servers, determines the data storage server for the particular data block in accordance with the map and transmits the particular data block to the determined data storage server; and
wherein each storage server receives data blocks from the clients through the computer network and comprises:
selection logic that enables data storage logic on the storage server if the selection logic determines according to the map, that the storage server is the data storage server for storing the particular received data block, and wherein the selection logic enables parity logic on the storage server if the selection logic determines, according to the map, that the storage server is the parity server for storing parity data for the group of data blocks including the particular received data block;
wherein the data storage logic, when enabled by the selection logic, stores the particular received data block on the storage server and relays a copy of the particular received data block to the parity server for the group of data blocks that includes the particular received data block in accordance with the map; and
wherein the parity logic, when enabled by the selection logic, generates parity data using the particular received data block and stores the parity data on the storage server.

13. The array-based distributed storage system of claim 12, wherein a group of data blocks forming a parity group is stored by one of the plurality of clients by:
the client accessing the map and sending each data block in the parity group to the storage server assigned to the data block by the map;
each storage server, when receiving one of the data blocks in the parity group from the client, enabling the data storage logic of the storage server to store the data block on the storage server and to relay a copy of the data block to the parity server assigned to the group of data blocks by the map;
the storage server that is the parity server assigned to the group of data blocks by the map receiving the copies of the data blocks from the other storage servers and enabling the parity logic of the storage server to compute and store a parity block for the group of data blocks.

14. In an array-based distributed storage system, comprising a plurality of clients that each include a communication interface, a plurality of storage servers that each include a communication interface, and a computer network interconnecting the plurality of clients and the plurality of storage servers through their respective communication interfaces, and storage for storing a map defining, for each data block in a group of data blocks, which of the plurality of storage servers is a data storage server for the data block and, for the group of data blocks, which of the plurality of storage servers is a parity server for parity data for the group of data blocks, wherein each of the plurality of storage servers acts as a data storage server and as a parity server for different groups of data blocks, wherein a storage server comprises data storage logic and parity logic, a process for storing a group of data blocks comprising a parity group, the process comprising:
a client, when storing the parity group on the storage servers, determining the storage server for each data block in accordance with the map;
the client transmitting each data block to the determined storage server for the data block
the storage servers receiving data blocks through the computer network;
each storage server determining, for a received data block and according to the map, an action to be performed by the storage server for the particular received data block;
each storage server, when determining that the received data block is to be stored, enabling the data storage logic of the storage server to store the data block on the storage server and relaying a copy of the data block to the parity server assigned to the group of data blocks by the map; and
the storage server, when determining that a received data block is one of the received data blocks from the other storage servers to be used in parity calculation, enabling the parity logic of the storage server to compute and store a parity block for the group of data blocks.

15. An array-based distributed storage system, comprising:
a plurality of clients that each include a communication interface,
a plurality of storage servers that each include a communication interface, a computer network interconnecting the plurality of clients and the plurality of storage servers through their respective communication interfaces;

storage for storing a map defining, for each data block of a data file, a first storage server, from among the plurality of storage servers, which stores the data block and a second storage server, from among the plurality of storage servers, which stores parity data derived using the data block;

wherein one of the plurality of clients, when storing a data file, determines, for each write request for each data block in the data file, the first storage server for the data block in accordance with the map and transmits the write request for the data block to the determined first storage server for the data block; and wherein each storage server, comprises:
   an input that receives data blocks from clients and other storage servers;
   selection logic;

wherein the selection logic enables data storage logic and relaying logic if the selection logic determines that the storage server is the first storage server for the received data block, wherein the data storage logic, when enabled by the selection logic, stores the received data block on the storage server; and wherein the relaying logic, when enabled by the selection logic, relays a copy of the received data block to the second storage server for the received data block;

wherein the selection logic enables parity logic if the selection logic determines that the storage server is the second storage server for the received data block;

wherein the parity logic, when enabled by the selection logic, generates and stores on the storage server a parity block using the received data block.

* * * * *